(12) United States Patent
Nakashima et al.

(10) Patent No.: US 7,471,187 B2
(45) Date of Patent: Dec. 30, 2008

(54) DOOR CONTROL SYSTEM AND METHOD

(75) Inventors: Kazuhiro Nakashima, Kariya (JP); Takeshi Kumazaki, Okazaki (JP); Ifushi Shimonomoto, Okazaki (JP)

(73) Assignee: DENSO CORPORATION, Kariya (JP)

( * ) Notice: Subject to any disclaimer, the term of this patent is extended or adjusted under 35 U.S.C. 154(b) by 483 days.

(21) Appl. No.: 11/110,842

(22) Filed: Apr. 21, 2005

(65) Prior Publication Data

US 2005/0237152 A1    Oct. 27, 2005

(30) Foreign Application Priority Data

Apr. 23, 2004    (JP) ............................. 2004-128357

(51) Int. Cl.
*H04B 1/00* (2006.01)
*G05B 19/00* (2006.01)
*G06F 7/00* (2006.01)

(52) U.S. Cl. ................ 340/5.61; 340/5.65; 340/825.72; 340/825.69; 340/825.71; 340/426.16; 340/425.5; 340/539.11; 340/10.1; 340/10.34; 340/10.4; 340/10.41; 340/10.42; 340/10.5; 307/10.1; 307/10.2; 307/10.5; 455/343.3

(58) Field of Classification Search ............ 340/539.23, 340/825, 825.69, 825.31
See application file for complete search history.

(56) References Cited

U.S. PATENT DOCUMENTS

| 5,517,189 | A | * | 5/1996 | Bachhuber et al. ......... 340/5.64 |
| 5,682,135 | A | * | 10/1997 | Labonde ................ 340/426.17 |
| 5,973,611 | A | * | 10/1999 | Kulha et al. ................ 340/5.62 |
| 6,218,932 | B1 | * | 4/2001 | Stippler ................ 340/426.16 |
| 6,778,065 | B1 | * | 8/2004 | Asakura et al. ............ 340/5.61 |
| 2001/0052839 | A1 | * | 12/2001 | Nahata et al. ............. 340/5.72 |
| 2003/0095040 | A1 | | 5/2003 | Shimomura | |

FOREIGN PATENT DOCUMENTS

JP    A-2003-138817    5/2003

* cited by examiner

*Primary Examiner*—Brian A Zimmerman
*Assistant Examiner*—Nam V Nguyen
(74) *Attorney, Agent, or Firm*—Posz Law Group, PLC (57) ABSTRACT

In a door control system, in polling collation processing, a start request signal is intermittently transmitted from a vehicle. When a human around the vehicle is detected, a start request signal is transmitted from the vehicle with high output power. A portable device returns a response signal to the vehicle. Furthermore, when the start request signal is transmitted at the high output power, the reception sensitivity is set to be lower than the normal sensitivity. When receiving the response signal from the portable device, the vehicle transmits an ID request signal, and acquires an ID code from the portable device. The ID code thus acquired is collated with each ID code registered in the vehicle. When both ID codes agree, the vehicle doors are unlocked.

4 Claims, 6 Drawing Sheets

FIG. 7

DOOR CONTROL SYSTEM AND METHOD

CROSS REFERENCE TO RELATED APPLICATION

This application is based on and incorporates herein by reference Japanese Patent Application No. 2004-128357 filed on Apr. 23, 2004.

FIELD OF THE INVENTION

The present invention relates to a door control system including a portable device for transmitting ID information, and a door control method for carrying out unlocking control of a door based on the ID information received from the portable device.

BACKGROUND OF THE INVENTION

A keyless entry system is one of a door unlocking system for a vehicle or buildings (for example, JP2003-138817A). In a conventional keyless entry system, an ID code which is transmitted from a portable device is received at a vehicle side and then collated with each ID code pre-registered in the vehicle. If both ID codes are coincident with each other, doors of the vehicle are unlocked.

According to this keyless entry system, a user presses down an unlocking switch provided on the portable device to transmit the ID code from the portable device to the vehicle. Alternatively, a request signal is transmitted from the vehicle side and then the portable device receiving the request signal transmits the ID code to the vehicle This keyless entry system is very convenient because a mechanical key is not required to be inserted into a key cylinder in order to unlock doors of a vehicle. Particularly, in the case of the latter keyless entry system, it is unnecessary for a user to carry out a switch operation (press of an unlocking switch or the like). Thus the user can easily unlock the doors even when both hands of the user are unusable.

However, in the above keyless entry system, a dark current consumed in the vehicle increases because the request signal is intermittently transmitted, and thus the probability of battery run-down increases.

Furthermore, if the output level of the request signal is lowered to reduce the dark current, the communication with the portable device cannot be established because of noises or the like. It is thus impossible to acquire the ID code from the portable device. In addition, when the output interval of the request signal is lengthened to reduce the dark current, the system response associated with the unlocking operation is lowered.

SUMMARY OF THE INVENTION

Therefore, an object of the present invention is to provide a door control system and method which can enhance the system response associated with a door control operation and also enhance resistance to noises with suppressing dark current in a door control system for transmitting a request signal intermittently.

According to a door control system of the present invention, an intermittent transmitting unit intermittently transmits a request signal irrespective of presence or absence of a human (vehicle user) around a door, and a detection transmitting unit transmits a request signal based on presence or absence of a human around the door separately from the transmission of the request signal by the intermittent transmitting unit.

Therefore, even when a user having a portable device is away from the door to some extent, the communication with the portable device can be established and ID information can be transmitted to the portable device. This contributes to the system response associated with the unlocking operation.

The detection transmitting unit transmits the request signal based on the presence or absence of a human around a door. Therefore, under such an environment that the portable device fails to receive the request signal although the user having the portable device is around a door, the detection transmitting unit can transmit the request signal at higher speed than the intermittent transmitting unit, so that the portable device is allowed to transmit ID information.

That is, when the portable device fails to receive a request signal transmitted from the intermittent transmitting unit, it cannot receive a request signal from the intermittent transmitting unit until the output period of a next request signal comes. However, when the user having the portable device approaches, the portable device can receive the request signal from the detection transmitting unit through the operation of the detection transmitting unit, and it can supply ID information to the unlocking controller at a high speed.

Even when the transmission interval of the intermittent transmitting unit is increased, the request signal is transmitted from the detection transmitting unit when the user of the portable device approaches a door, so that the system response can be kept to a high level. Specifically, the system response associated with the unlocking operation can be enhanced under an environment which has a lot of surrounding noise and is not preferable to a communication environment while suppressing dark current by increasing the transmission interval of the request signal from the intermittent transmitting unit.

The detection transmitting unit may be designed so as to transmit a request signal to the outside of a vehicle by one shot every time it detects presence of a human. According to this system, the dark current can be suppressed, and the system response associated with the unlocking operation under the environment which has a lot of surrounding noise and is not preferable to the communication environment can be further enhanced.

Here, "by one shot" means that the transmission operation of the request signal by the detection transmitting unit is completed by a predetermined series of operations. The series of operations are not repeated with no variation of the detection result of the human detecting unit. For example, the detection transmitting unit may be designed so as to transmit the request signal at a specified number of times every time the human detecting unit detects presence of a human.

Alternatively, it may be designed so as to continuously transmit the request signal at plural times for a predetermined period every time the human detecting unit detects presence of a human. If the system is designed so that the request signal is transmitted at plural times, the power consumption of the system is increased. The system response however associated with the unlocking operation under the environment which has a lot of surrounding noise and is not preferable to the communication environment can be further enhanced.

Furthermore, in order to enhance the resistance to noise, the detection transmitting unit may be designed so that the request signal is transmitted to the outside of the vehicle at an output level higher than the output level of the intermittent transmitting unit. Thus, the portable device can be made to receive the request signal and transmit the ID information under such an environment that the surrounding noise is severe.

Accordingly, there can be sufficiently prevented occurrence of such a problem that when the surrounding noise is severe, the ID information cannot be achieved from the portable device and thus the doors cannot be unlocked. Furthermore, the communication under the environment that the surrounding noise is severe can be guaranteed by the detection transmitting unit, so that the output level of the request signal transmitted from the intermittent transmitting unit can be reduced to a level smaller than the conventional level and the dark current can be reduced.

As described above, when the output level of the detection transmitting unit is increased, the S/N ratio is increased at the portable device side, and thus the resistance of the system to the noise is enhanced. When the reception sensitivity of the portable device is fixed irrespective of the output level of the request signal, a receivable area where the portable device receives a request signal transmitted from the unlocking controller and transmits ID information is enlarged, however, some security problem may occur.

That is, even when an authorized user owning the portable device is at a place where the human detecting unit cannot detect the user, the human detecting unit would react to another person different from the authorized user if the place is within a request signal receivable area, so that the detection transmitting unit may operate to unlock the doors.

Accordingly, when the output level of the request signal in the detection transmitting unit is set to be higher than the output level of the intermittent transmitting unit, the reception sensitivity of the receiver may be changed so that the receivable area of the request signal is not varied by variation of the output level.

Furthermore, when the request signal the reception of which is started is determined as a request signal from the detection transmitting unit, the reception sensitivity of the receiving unit is set to reception sensitivity lower than that at the reception time of the initial signal. With respect to a non-received part of the request signal the reception of which is started, the receiving unit is made to receive the signal concerned at reception sensitivity lower than that of the initial signal.

In the system, the portable device can be made to switch the reception sensitivity of the receiving unit by attaching information indicating a transmission source to the initial signal of the request signal, and even when the request signal is transmitted at a high output level by the detection transmitting unit, the receivable area can be suppressed from being expanded. Accordingly, it can be prevented that doors are unlocked without authorized user's recognition.

Furthermore, in a case where the system is operated by a battery mounted in a vehicle, if the intermittent transmitting unit is operated without any restriction, the battery may run out and it is impossible to start the engine. Accordingly, when the system is operated by a battery mounted in a vehicle, the system may be designed so that when the locking of the doors is continued for a predetermined first period, the operation of the intermittent transmitting unit is stopped. Furthermore, at this time, the operation of the detection transmitting unit may be stopped in association with the intermittent transmitting unit.

Furthermore, in this case, the operation of the detection transmitting unit may be stopped simultaneously with the stop of the operation of the intermittent transmitting unit. However, in order to lengthen the actuation time of the system, the detecting transmitting unit having smaller power consumption may be operated for a certain time after the operation of the intermittent transmitting unit is stopped. Then the operation of the detection transmitting unit may be stopped.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
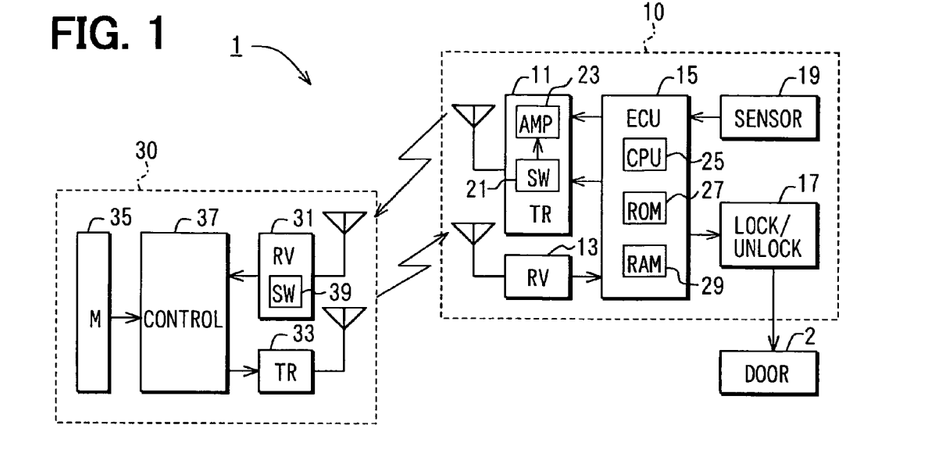
FIG. 1 is a block diagram showing a keyless entry system according to an embodiment of the present invention.

Referring to FIG. 1, a keyless entry system 1 is directed to a door control system such as a door unlocking system of a vehicle 10. The keyless entry system 1 comprises a transmitter 11, a receiver 13, a smart key ECU 15 and a lock/unlock device 17 of vehicle doors which are mounted in the vehicle 10, a human sensor 19 and a portable device 30. The portable device 30 is carried by a user.

The transmitter 11 and the receiver 13 which are provided in the vehicle 10 are used to make radio communications with the portable device 30 bi-directionally. The transmitter 11 transmits each request signal to the outside of the vehicle 10, and the receiver 13 receives signals (ACK signal, ID code, etc.) transmitted from the portable device 30 from the outside of the vehicle. The transmitter 11 is provided with a switching circuit 21 for switching the output level of the radio signals. Based on an instruction from the smart key ECU 15, the switching circuit 21 switches the gain of the amplifier 23 to high (H) or low (L).

The smart key ECU 15 is constructed as a computer comprising a the CPU 25, a ROM 27 and a RAM 29. The ROM 27 stores various kinds of programs to be executed by the CPU 25, ID codes, etc., and The RAM 29 is used as a working memory when the programs are executed by the CPU 25.

The CPU 25 contained in the smart key ECU 15 controls the transmitter 11 and the receiver 13 by execution of the programs stored in the ROM 27 to implement two-way communications with the portable device 30. In addition, the CPU 25 controls the lock/unlock device 17 so that the lock/unlock device 17 carries out door locking and unlocking operations. The CPU 25 also achieves a human detection signal which is output from the human sensor 19 as a detection result of the human sensor 19 and represents presence or absence of a human (vehicle user) around vehicle doors.

The lock/unlock device 17 comprises an actuator for locking and unlocking doors 2 of the vehicle 10. A lock moves between a lock position and an unlock position by the actuator. The human sensor 19 is provided in the neighborhood of a knob or handle of each door 2 of the vehicle 10. Based on whether a hand of a human gets into a predetermined area in the neighborhood of each door knob, the human sensor 19 detects presence of the human around the vehicle door 2 and also detects a door opening/closing intention.

The human sensor 19 may be constructed with a heat ray (IR) sensitive sensor, for example. In this case, presence of a human can be detected based on whether the body temperature of a human is sensed with the above area. The human sensor 19 may be constructed with an ultrasonic sensor. In this case, presence of a human can be detected by detecting invasion of an object into the above area with ultrasonic waves. Furthermore, a touch sensor may be provided as the human sensor 19 to the door knob to detect whether a human touches the door knob.

The portable device 30 comprises a receiver 31 for receiving various kinds of request signals transmitted from the transmitter 11 of the vehicle 10, a transmitter 33 for transmitting to the vehicle 10 an ACK signal (acknowledgement signal) to the start request signal, an ID code specific to the portable device 30, an manipulating part 35 having an unlocking switch and locking switch, etc., and a controller 37 for storing the ID code specific to the portable device 30 concerned and collectively controlling the respective parts of the portable device 30. It thus functions as a smart key (electronic key).

When receiving an ID request signal transmitted from the vehicle 10 through the receiver 31, the controller 37 of the portable device 30 transmits the above ID code through the transmitter 33 to the vehicle 10. Through the above operation, the portable device 30 implements unlocking of the doors of the vehicle without any user's operation of the manipulating part 35 within an area where the ID request signal is receivable (receivable area).

The receiver 31 is provided with a sensitivity switching circuit 39 which can switch the reception sensitivity of the ID request signal transmitted from the vehicle 10. The controller 37 controls the sensitivity switching circuit 39 to set the reception sensitivity of the receiver 31 to the sensitivity corresponding to the output level of the ID request signal transmitted from the vehicle 10. Accordingly, even when the output level of the ID request signal transmitted from the vehicle 10 is switched, the output range of the ID code of the portable device 30 with the vehicle 10 at a start point (a range in which the unlocking of the vehicle is implemented by the portable device 30) is kept to be substantially fixed.

The sensitivity switching circuit 39 is designed so that the reception sensitivity of the receiver 31 can be switched to high or low. Specifically, the receiver 31 is designed so as to make a reception determination when the reception level of a reception signal detected by a reception level detector (RSSI: received signal strength indicator) (not shown) contained in the receiver 31 is equal to a reference value or more, and inputs the reception result to the controller 37. The sensitivity switching circuit 39 sets the reception sensitivity to high by setting the reference value to a first value and sets the reception sensitivity to low by setting the reference value to a second value larger than the first value.

Furthermore, when the locking switch or the unlocking switch of the manipulating part 35 is pressed, the controller 37 of the portable device 30 transmits the operation information thereof (a locking instruction signal or an unlocking instruction signal) and also the ID code thereof so that the lock/unlock device 17 of the vehicle 10 is made to execute locking or unlocking through the smart key ECU 15.

That is, when receiving the locking instruction signal or the unlocking instruction signal by the receiver 13, the smart key ECU 15 receives the ID code transmitted from the portable device 30 together with the above signal, and collates the ID code with each ID code pre-registered in the ROM 27. If both the ID codes are coincident with each other, the smart key ECU 15 determines success of the collation and makes the lock/unlock device 17 to execute the locking operation of the vehicle doors when the reception signal is the locking instruction signal or execute the unlocking operation of the vehicle doors when the reception signal is the unlocking instruction signal.

The function on/off processing and the polling collation processing which are executed by the CPU 25 of the smart key ECU 15 and the ID transmission processing executed by the controller 37 of the portable device 30 will be described below. The keyless entry system 1 of this embodiment implements the function as the smart key system by executing these processing.

Figure 2:
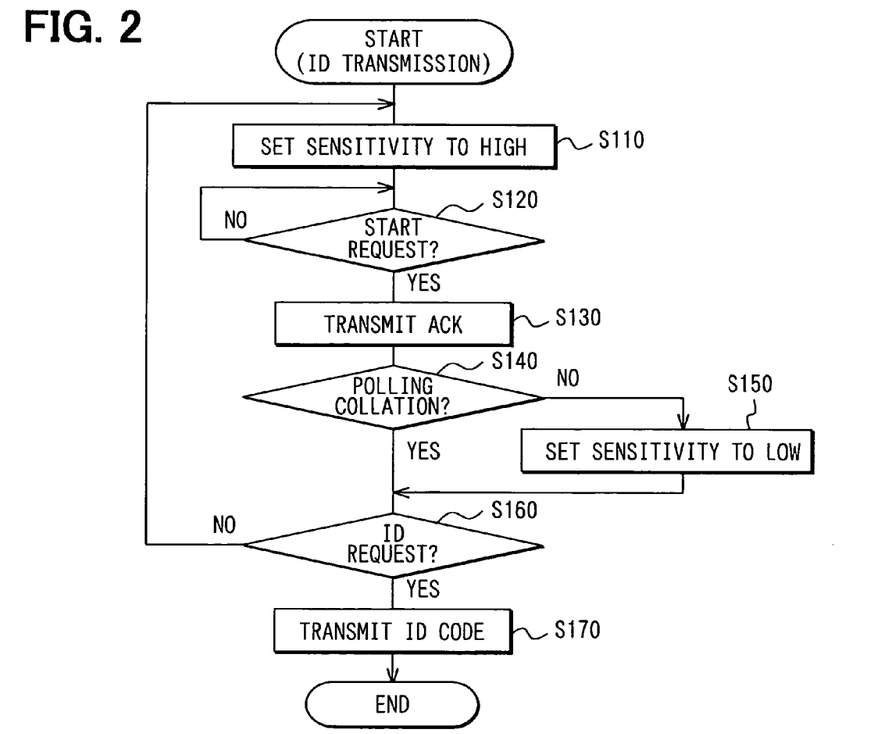
FIG. 2 is a flowchart showing ID transmission processing executed by a controller of a portable device in the embodiment.

The portable device 30, particularly the controller 37, repetitively executes ID transmission processing shown in FIG. 2.

When executing the ID transmission processing, the controller 37 of the portable device 30 controls the sensitivity switching circuit 39 to set the signal reception sensitivity of the receiver 31 to high as an initial value (S110). Thereafter, the controller 37 waits its processing until it receives a start request signal transmitted from the vehicle 10 through the receiver 31 (S120). When receiving the start request signal (YES at S120), it transmits an ACK signal as an acknowledgement signal to the start request signal through the transmitter 33 to the vehicle 10 (S130).

Figure 4:
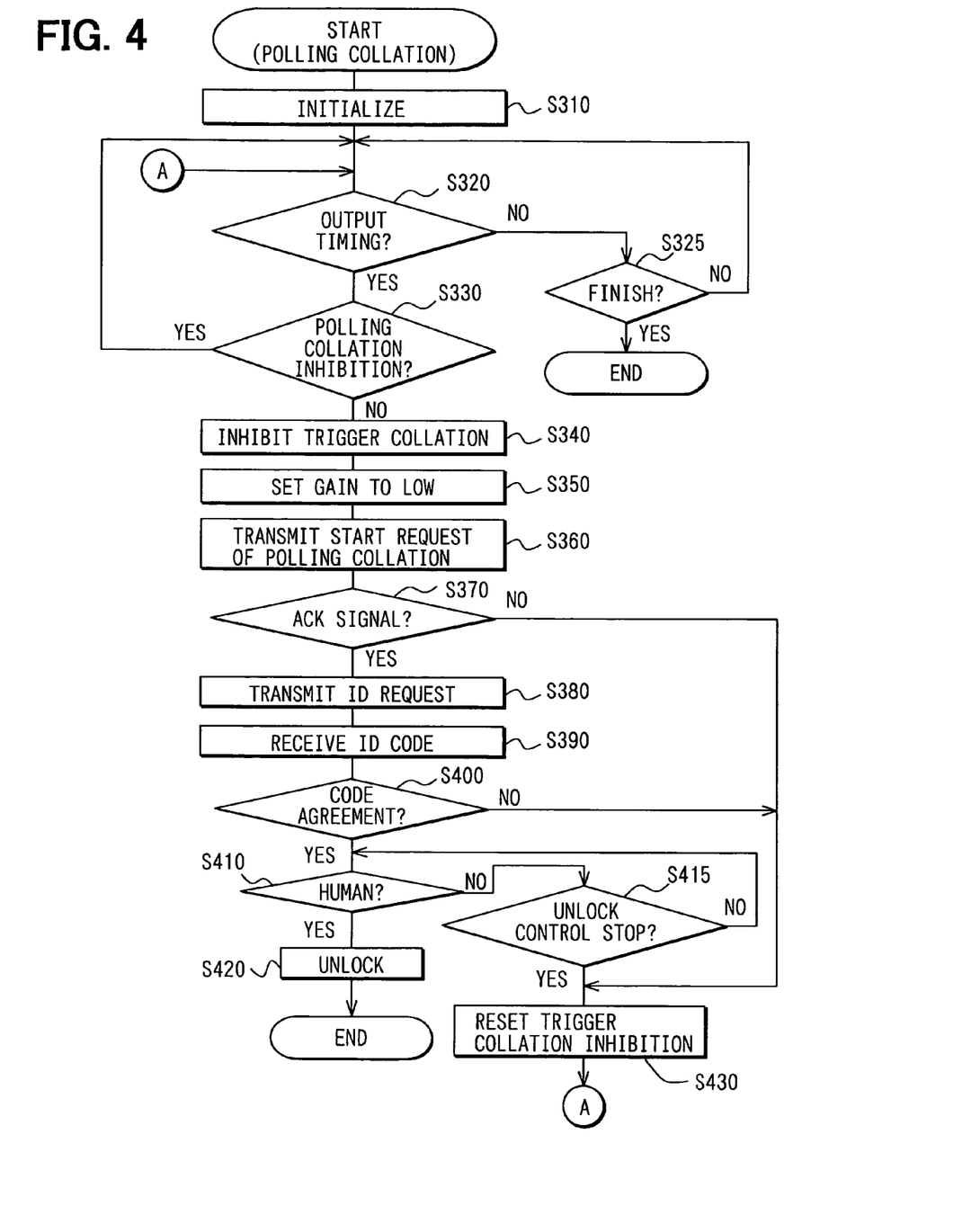
FIG. 4 is a flowchart showing polling collation processing executed by a CPU in the embodiment.
Figure 5:
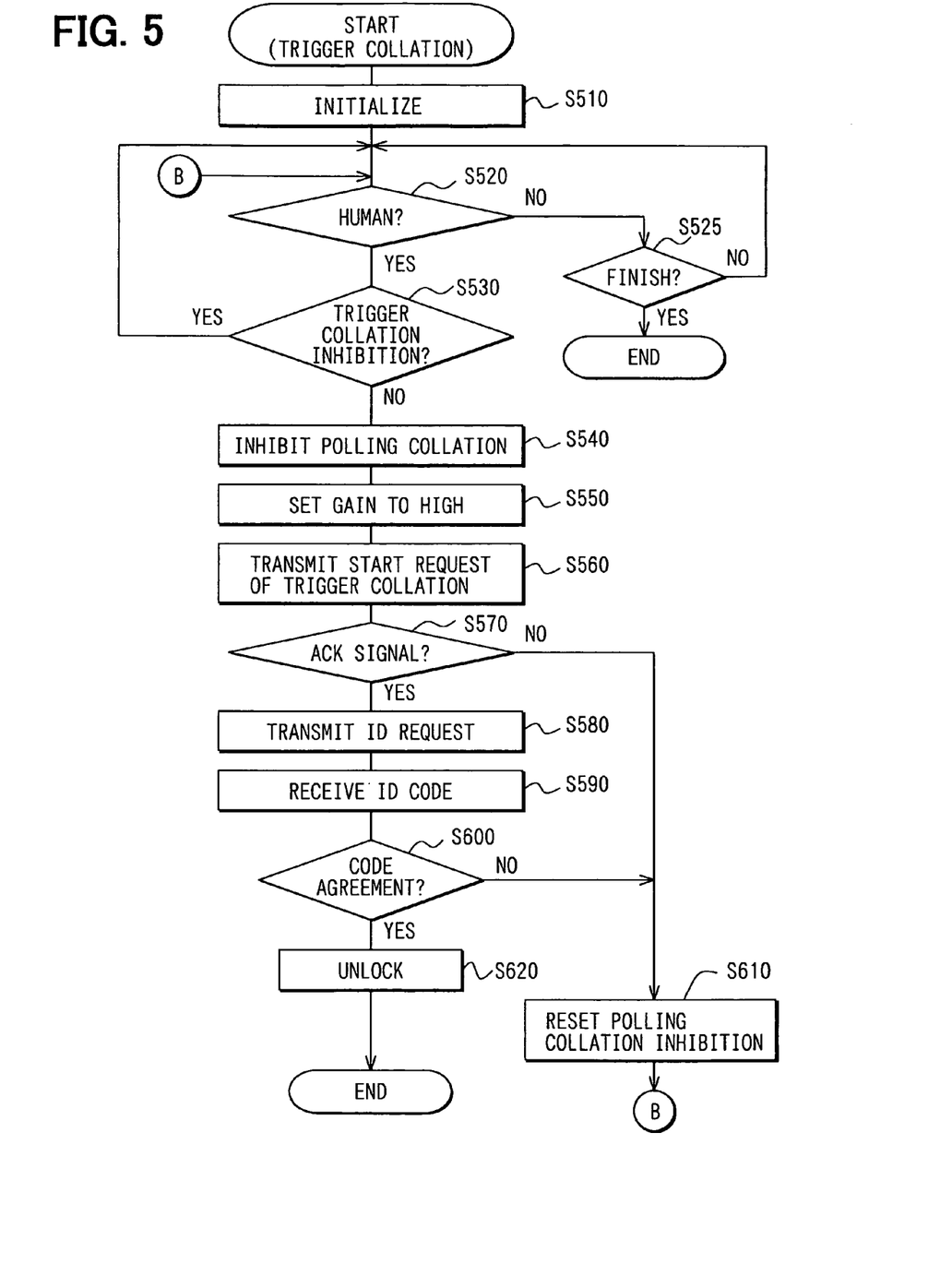
FIG. 5 is a flowchart showing trigger collation processing executed by a CPU in the embodiment.

Based on mode information contained in the start request signal, it is determined whether the start request signal thus received is a start request signal instructing an operation based on a first mode which is transmitted from the vehicle 10 through the polling collation processing of FIG. 4, or a start request signal instructing an operation based on a second mode which is transmitted from the vehicle 10 through the trigger collation processing of FIG. 5 (S140).

Here, if it is determined that the start request signal received is the start request signal instructing the operation based on the first mode transmitted from the vehicle 10 through the polling collation processing, the controller 37 proceeds to S160 while the reception sensitivity of the receiver 31 is kept high. On the other hand, if it is determined that the start request signal received is the start request signal instructing the operation based on the second mode transmitted from the vehicle 10 through the trigger collation processing, the controller 37 controls the sensitivity switching circuit 39 to set the reception sensitivity of the receiver 31 to lower reception sensitivity (Low) than the reception sensitivity at the reception time of the start request signal, and then proceeds to S160.

At S160, the controller 37 waits for reception of the ID request signal for a predetermined period. If the controller 37 determines that it cannot receive the ID request signal from the vehicle 10 through the receiver 31 within the predetermined period (NO at S160), the controller 37 returns to S110 to set the reception sensitivity of the receiver 31 to high again, and then waits for reception of the start request signal again (S120).

On the other hand, when receiving the ID request signal from the vehicle 10 through the receiver 31 within the predetermined period (YES at S160), the controller 37 transmits an ID code stored in itself through the transmitter 33 to the vehicle 10 (S170). Thus, the controller 37 finishes the ID transmission processing.

Figure 3:
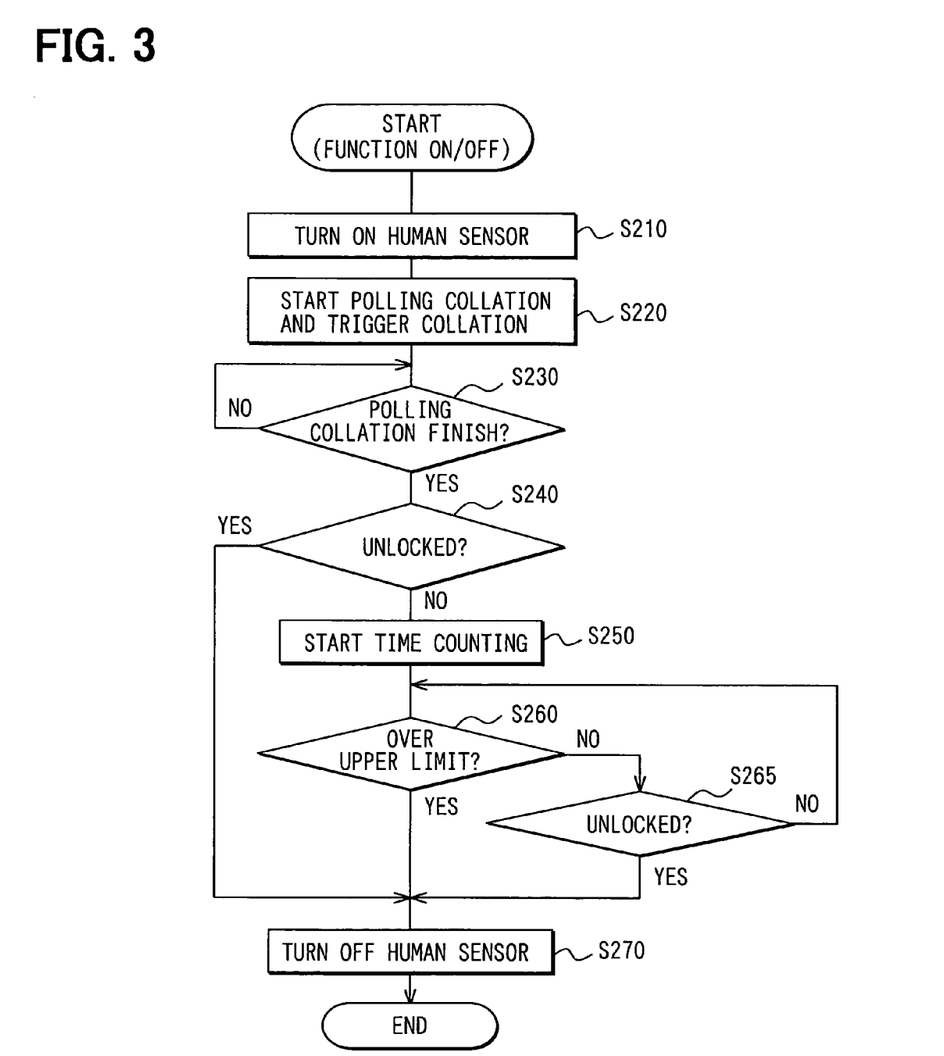
FIG. 3 is a flowchart showing function on/off processing executed by a CPU of a smart key ECU in the embodiment.

The smart key ECU 15, particularly the CPU 15, repetitively executes function on/off processing shown in FIG. 3, polling collation processing shown in FIG. 4, and trigger collation processing shown in FIG. 5.

Based on a status signal output from the lock/unlock device 17 or an output signal of another ECU mounted in the vehicle 10, the CPU 25 of the smart key ECU 15 determines whether the start condition of the smart key system is satisfied or not. If the CPU 25 determines that the start condition is satisfied, it executes the function on/off processing shown in FIG. 3.

When the function on/off processing is executed, the CPU 25 turns on (starts) the human sensor 19 (S210) to start detecting a human, and then starts execution of the polling collation processing and the trigger collation processing (S220).

When the polling collation processing is executed, the CPU 25 executes initialization processing concerning a flag described later, etc. (S310), and then determines whether the output timing of the start request signal comes (S320). If the CPU 25 determines that the output timing of the start request signal does not come (NO at S320), it determines whether a finishing condition is satisfied or not (S325). If it is not determined that the finishing condition is not satisfied (NO at S325), the CPU 25 waits until the output timing comes or the finishing condition is satisfied. In this embodiment, the output timing comes intermittently every fixed interval.

If it is determined that the finishing condition is satisfied (YES at S325), the CPU 25 finishes the polling collation processing. In this case, if a predetermined period (for example, about several weeks) elapses while the vehicle doors are locked or the vehicle doors are unlocked, the finishing condition is determined as being satisfied, and the polling collation processing is finished.

On the other hand, if it is determined that the output timing of the start request signal comes (YES at S320), the CPU 25 determines through a trigger collation processing task whether an operation inhibiting flag of the polling collation processing is set or not (S330). Here, if it is determined that the operation inhibiting flag of the polling collation processing is set (YES at S330), the CPU 25 shits its processing to S320. If it is determined that no operation inhibiting flag of the polling collation processing is set (NO at S330), the operation inhibiting flag of the trigger collation processing is set (S340).

Thereafter, the CPU 25 controls the switching circuit 21 to set the gain of the amplifier 23 to low (S350), and transmits through the transmitter 11 to the outside of the vehicle the start request signal containing mode information which indicates the operation based on the first mode to the portable device 30 (S360). At this time, the gain of the amplifier 23 is set to low, and thus the start request signal is transmitted from the transmitter 11 at a normal low output level.

When the transmission of the start request signal is finished, the CPU 25 waits for reception of an ACK signal transmitted from the portable device 30 for a predetermined period (S370). When receiving the ACK signal from the portable device 30 through the receiver 13 (YES at S370), the CPU 25 transmits an ID request signal to the outside of the vehicle through the transmitter 11 (S380), and receives through the receiver 13 an ID code transmitted from the portable device 30 in response to the ID request signal (S390). The ID request signal is transmitted from the transmitter 11 at a normal low output level as in the case of the start request signal transmitted at S360.

Furthermore, when no ACK signal from the portable device 30 is received within the predetermined period, the CPU 25 determines that there is no response from the portable device 30 (NO at S370). It resets the operation inhibiting flag of the trigger collation processing (S430), and then returns to S320.

When the processing at S390 is finished, the CPU 25 collates the ID code received at S390 with each ID code pre-registered in ROM 27. If both the ID codes are in agreement with each other, the CPU 25 determines the success of the collation (YES at S400) and proceeds to S410. On the other hand, if there is no agreement between the ID codes or if the ID code from the portable device 30 cannot be normally received and thus no collation cannot be performed, the CPU 25 determines that the collation fails (NO at S400), and returns to S320 after resetting the operation inhibiting flag of the trigger collation processing (S430).

When proceeding to S410, the CPU 25 determines based on a human detection signal input from the human sensor 19 whether the human sensor 19 detects presence of a human (S410). If it is determined that the human sensor 19 does not detect presence of any human (NO at S410), it determines whether a stop condition for stopping the unlock control is satisfied or not (S415). In this embodiment, when the collation of the ID code succeeds and then a predetermined period elapses, it is determined that the stop condition for stopping the unlock control is satisfied.

The CPU 25 repeats this operation until the human sensor 19 detects presence of a human or the stop condition under unlock control is satisfied. When it is determined that the stop condition of the unlock control is satisfied (YES at S415), the CPU 25 resets the operation inhibiting flag of the trigger collation processing (S430), and then returns to S320. On the other hand, if the human sensor 19 detects presence of a human (YES at S410), the CPU 25 controls the lock/unlock device 17, and makes the lock/unlock device 17 to unlock the vehicle doors (S420). Thereafter, the polling collation processing is finished.

Furthermore, when the trigger collation processing is executed at S220, the initialization processing concerning the flag, etc. is executed by the CPU 25 (S510). Then it is determined based on the human detection signal of the human sensor 19 whether the human sensor 19 detects presence of a human around the vehicle doors (S520). In addition, it is determined whether the finishing condition is satisfied (S525). The CPU 25 waits until the human sensor 19 detects presence of a human or the finishing condition is satisfied. If it is determined that the finishing condition is satisfied (YES at S525), the trigger collation processing is finished. In this case, when the human sensor 19 is turned off or the vehicle doors are unlocked, it is determined that the finishing condition is satisfied, and the trigger collation processing is finished.

On the other hand, if it is determined that the human sensor 19 detects presence of any human around the vehicle doors (YES at S520), the CPU 25 determines through the polling collation processing task whether the operation inhibiting flag of the trigger collation processing is set or not (S530). If it is determined that the operation inhibiting flag of the trigger collation processing is set (YES at S530), the CPU 25 returns to S520. Conversely, if it is determined that the operation inhibiting flag of the trigger collation processing is not set (NO at S530), the CPU 25 proceeds to S540 to set the operation inhibiting flag of the polling collation processing.

Thereafter, the CPU 25 controls the switching circuit 21 to set the gain of the amplifier 23 to high (S550), and transmits through the transmitter 11 to the outside of the vehicle a start request signal containing the mode information which indicates the operation based on the second mode (trigger collation) to the portable device 30 (S560). At this time, the gain of the amplifier 23 is set high, and thus the start request signal is transmitted from the transmitter 11 at an output level higher than the normal output level at the transmission time in the polling collation processing.

When the transmission of the start request signal is finished, the CPU 25 waits for reception of an ACK signal transmitted from the portable device 30 for a predetermined period (S570). When receiving the ACK signal from the portable device 30 through the receiver 13 (YES at S570), the CPU 25 transmits an ID request signal through the transmitter 11 to the outside of the vehicle (S580), and receives through the receiver 13 an ID code which is transmitted from the portable device 30 in response to the ID request signal (S590). The gain of the amplifier 23 is set high at the execution time of the processing at S580. Thus the ID request signal is transmitted from the transmitter 11 at an output level higher than the normal output level at the transmission time of the polling collation processing like the start request signal.

On the other hand, if it is determined that there is no response from the portable device 30 within the predetermined period and the ACK signal cannot be received (NO at S570), the CPU 25 resets the operation inhibiting flag of the polling collation processing (S610), and then returns to S520.

When the processing of S590 is finished, the CPU 25 collates the ID code received at S590 with each ID code pre-registered in ROM 27 (S600). Here, when both the ID codes are not in agreement with each other or when the ID code from the portable device 30 cannot be normally received and thus the collation is impossible, it is determined that the collation fails (NO at S600), and the CPU 25 resets the operation inhibiting flag of the polling collation processing (S610) and proceeds to S520.

On the other hand, when both the ID codes agree with each other, the CPU 25 determines that the collation succeeds (YES at S600), and controls the lock/unlock device 17 so that the lock/unlock device 17 unlocks the doors of the vehicle (S620). Thereafter, the trigger collation processing is finished.

When starting execution of the trigger collation processing and the polling collation processing (S220) as described above, the CPU 25 waits for its processing until the polling collation processing is finished (S230). The polling collation processing is finished when the doors are unlocked or a predetermined period (first period) elapses wile the doors are locked.

When the polling collation processing is finished (YES at S230), the CPU 25 determines whether the doors are unlocked (S240). If it is determined that the doors are unlocked (YES at S240), the CPU 25 turns off the human sensor 19 (S270), and finishes the function on/off processing.

On the other hand, if it is determined that the doors are not unlocked (NO at S240), the CPU 25 starts time counting by using a time counter (not shown) provided in the smart key ECU 15 (S250). It continues to carry out time counting until a predetermined time elapses while the doors are locked (YES at S260) or the doors are unlocked (YES at S265).

When the predetermined time elapses while the doors are locked and the count time exceeds a predetermined upper limit value, "YES" is output (S260), and the human sensor 19 is turned off (S270). Accordingly, the trigger collation processing is finished, and the function on/off processing is finished. When the doors are unlocked (YES at S265), the human sensor 19 is also turned off (S270), and then the function on/off processing is finished.

Figure 6:
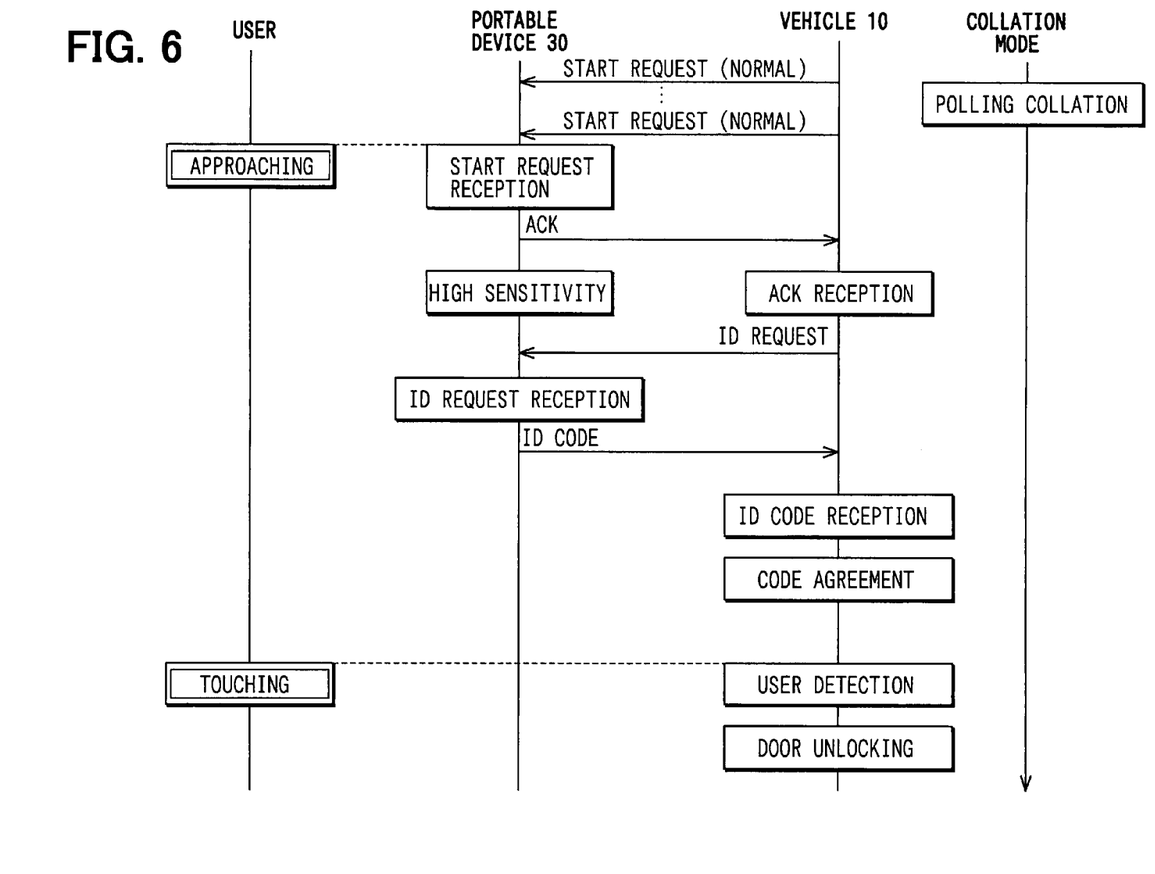
FIG. 6 is a sequence flow showing the relationship between each processing of the keyless entry system and a user's action.
Figure 7:
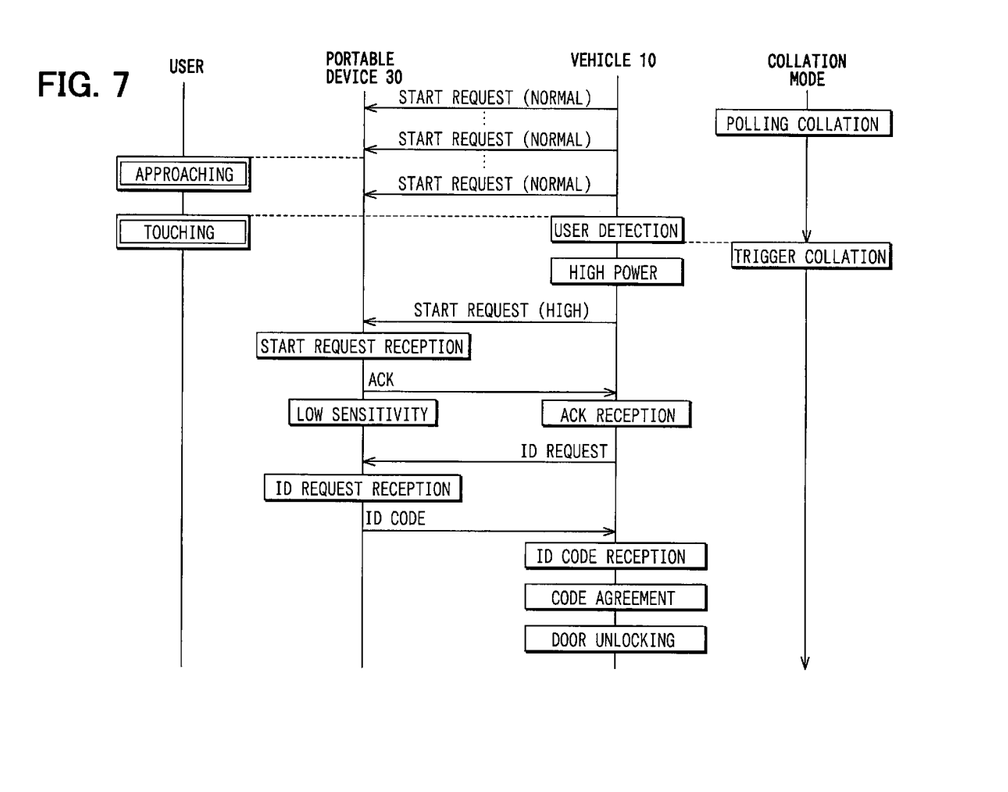
FIG. 7 is a sequence flow showing the relationship between each processing of the keyless entry system and the user's action when the trigger collation processing functions.

FIGS. 6 and 7 show a relationship between processing of the keyless entry system 1 thus operated and the user's action. FIG. 6 shows a case under the state that the communication environment around the vehicle is excellent and the unlock control of the doors can be performed by the polling collation processing. FIG. 7 shows a case under the state that the communication environment around the vehicle is not excellent due to noise or the like and the unlock control cannot be performed by the polling collation processing.

As shown in FIG. 6, under the condition that the communication environment around the vehicle is excellent, at the time point when the user owning the portable device 30 approaches the vehicle 10 and enters the receivable area of the start request signal and then the start request signal is first transmitted from the vehicle 10, the portable device 30 receives the start request signal and transmits the ACK signal to the vehicle 10. The ID code is transmitted from the portable device 30 to the vehicle 10 through the subsequent processing.

Therefore, in a case where the portable device 30 is an authorized portable device having an ID code associated with the vehicle 10, after the user owning the portable device 30 enters the receivable area of the start request signal, the vehicle doors enters an unlock standby state just at the time point when the start request signal is first transmitted from the vehicle 10. Accordingly, if the polling collation processing is set so that the start request signal is intermittently transmitted at such a time interval that the collation is completed until the user holds out his/her arm to touch a door knob, the vehicle doors can be immediately unlocked at the time point when the user holds out his/her arm and is about to open a door.

However, when the communication environment around the vehicle is not excellent, lots of noise components are contained in the reception signal. Accordingly, even when the user owning the portable device 30 enters a receivable area estimated under the condition that the communication environment is excellent, the portable device 30 cannot accurately receive the start request signal transmitted from the vehicle 10, and thus cannot transmit an ACK signal.

Normally in order to suppress dark current of the vehicle 10, the polling collation processing is set so that the start request signal is intermittently transmitted at such a time interval that the collation is completed around the time point when the user holds out his/her arm to a door knob under the excellent communication environment. However, if the portable device 30 fails in reception of the start request signal within the receivable area because of unfavorable communication environment, it would be impossible for only the polling collation processing to unlock the doors immediately at the time point when the user is about to open a door.

That is, as shown in FIG. 7, it may occur that the start request signal cannot be received at the portable device 30 side at the time point when the user is about to open a door. In this case, in the polling collation processing, no start request signal is transmitted unless the output timing comes. Therefore, if the smart key system is implemented by only the polling collation processing, the user must wait until the output timing of the start request signal comes and the doors are unlocked.

In order to implement the smart key system having excellent unlock response by only the polling collation processing, it is necessary to shorten the output interval of the start request signal or increase the output level of the start request signal in consideration of a case where the communication environment is not excellent. In this case, the dark current is increased in the vehicle 10, and the battery of the vehicle 10 may run out with high probability. Furthermore, if the output power level of the start request signal is easily increased, the unlock response would be enhanced. However, the power consumption is increased. Further, since the receivable area when the communication environment is excellent is expanded, a car theft may be caused with high probability.

On the other hand, according to the keyless entry system 1 of this embodiment, the trigger collation processing in addition to the polling collation processing are executed in the CPU 25 of the smart key ECU 15. Further, whenever the human sensor 19 detects presence of a human around vehicle doors, "YES" is output at S520 and the start request signal is transmitted to the portable device 30 by one shot. Therefore, even when the output interval of the start request signal by the polling collation processing is increased, influence on the system response associated with the unlocking operation can be sufficiently suppressed.

Especially, according to the keyless entry system 1 of this embodiment, the output levels of the start request signal and the ID request signal at the execution time of the trigger collation processing are set to be higher than the output levels at the execution time of the polling collation processing. Therefore, even when the communication environment is very severe, the communications between the vehicle 10 and the portable device 30 can be implemented, and occurrence of such a trouble that the smart key system does not function due to noise or the like can be prevented. Furthermore, if the output level of the request signal is increased, the controller 37 of the portable device 30 sets the reception sensitivity of the receiver 31 to a low value, thereby preventing occurrence of an improper operation which would occur when the output level of the request signal is increased.

That is, in the trigger collation processing, the start request signal and the ID request signal are transmitted at the output level higher than the normal output level. Therefore, if the reception sensitivity of the portable device 30 is fixed with respect to the output level of the request signal, the receivable area of the start request signal by the portable device 30 is excessively large when the communication environment is excellent.

The trigger collation processing aims to enhance the unlock response when the communication environment is not excellent. However, if a user having an authorized portable device 30 is within the receivable area, the doors are unlocked even when a malignant person holds out his/her arm to a door knob. Therefore, if the receivable area of the start request signal is needlessly enlarged, the door lock may be released by the action of an malignant person and this is not favorable on security.

On the other hand, in this embodiment, when the output level of the request signal is increased, the controller 37 of the portable device 30 sets the reception sensitivity of the receiver 31 to a low level. Therefore, the receivable area is not excessively enlarged in connection with the increase of the output level of the request signal, and an operation which is at user's will can be prevented from being carried out on the vehicle 10, and the security of the keyless entry system 1 can be enhanced.

Furthermore, in the keyless entry system 1 of this embodiment, the polling collation processing is executed restrictively for only the predetermined period (first period), and when the unlocking is not carried out within that period, the polling collation processing is finished, and only the trigger collation processing is executed. Furthermore, when the unlocking is not carried out within a predetermine time (second period) after the polling collation processing is finished, power supply to the human sensor 19 is stopped to stop the human sensor 19, and the trigger collation processing is finished at the same time. Therefore, the battery can be prevented from running out due to dark current or the like.

In the keyless entry system 1 of this embodiment, an unlocking controller is implemented by the transmitter 11, the receiver 13, the smart key ECU 15, the lock/unlock device 17 of vehicle doors and the human sensor 19. The receiving unit of the portable device 30 corresponds to the receiver 31, and the transmission control unit is implemented by ID transmission processing (subsequent to S160) executed by the controller 37 of the portable device 30. The request signal transmitted from the unlock control device comprises the start request signal as an initial signal and the ID request signal as a subsequent signal.

The intermittent transmitting unit of the unlocking controller is implemented by the polling collation processing executed by the transmitter 11 and the CPU 25. The human detecting unit of the unlocking controller corresponds to the human sensor 19, and the detection transmitting unit is implemented by the trigger collation processing executed by the transmitter 11 and the CPU 25. Furthermore, the determination unit equipped to the portable device 30 is implemented by the ID transmission processing (S140) executed by the controller 37, and the sensitivity setting unit is implemented by the ID transmission processing (S150) executed by the sensitivity switching circuit 39 and the controller 37.

The first stopping unit is implemented by the polling collation processing (S325) executed by the CPU 25, and the second stopping unit is implemented by the processing of S240 to S270 of the function on/off processing executed by the CPU 25 and the processing (S525) of the trigger collation processing.

Furthermore, the unlocking system and the unlocking controller according to the present invention are not limited to the above embodiments, and various modifications may be made. For example, in the polling collation processing, after the collation succeeds and then the human sensor 19 detects a human, the doors are unlocked. However, after the collation succeeds, the doors may be immediately unlocked irrespective of detection of a human by the human sensor 19. Further, the door control system may be directed to other structures other than a vehicle.

What is claimed is:

1. An unlocking system comprising:
   a portable device having a transmitting means for transmitting ID information; and
   an unlocking controller for receiving the ID information transmitted from the transmitting means and performing unlocking control of a door based on the ID information received from the transmitting means,
   wherein the portable device includes:
     a receiving means for receiving one of a first request signal and a second request signal transmitted from the unlocking controller; and
     a transmission control means for making the transmitting means transmit the ID information after reception of the one of the request signals by the receiving means,
   wherein the receiving means varies a reception sensitivity of the one of the request signals, and
   wherein the unlocking controller includes:
     an intermittent transmitting means for intermittently transmitting the first request signal to the portable device outside of a vehicle;
     a human detecting means for detecting presence of a human around the door; and
     a detection transmitting means for transmitting the second request signal to the portable device based on a human detection result of the human detecting means,
   wherein the detection transmitting means transmits the second request signal to the outside of the vehicle with an output power level higher than the output power level of the intermittent transmitting means, wherein the detection transmitting means transmits the second request signal to the outside of the vehicle by one shot every time the human detecting means detects the presence of the human, and wherein the portable device further includes:
a determination means for determining, based on an initial signal of the request signal, whether the one of the request signals for which reception of the one of the request signals by the receiving unit is started is the second request signal from the detection transmitting means when the reception of the one of the request signals is started by the receiving means; and
a sensitivity setting means for setting the reception sensitivity of the receiving means to a sensitivity lower than that at a reception time of the initial signal if it is determined, by the determination means, that the initial signal is a request from the detection transmitting means.

2. An unlocking system comprising:
a portable device having a transmitting means for transmitting ID information; and
an unlocking controller for receiving the ID information transmitted from the transmitting means and performing unlocking control of a door based on the ID information received from the transmitting means,
wherein the portable device includes:
a receiving means for receiving one of a first request signal and a second request signal transmitted from the unlocking controller; and
a transmission control means for making the transmitting means transmit the ID information after reception of the one of the request signals by the receiving means, and
wherein the unlocking controller includes:
an intermittent transmitting means for intermittently transmitting the first request signal to the portable device outside of a vehicle;
a human detecting means for detecting presence of a human around the door;
a detection transmitting means for transmitting the second request signal to the portable device based on a human detection result of the human detecting means;
a first stopping means for stopping an operation of the intermittent transmitting means when a locking state of the door is continued for a predetermined first period; and
a second stopping means for stopping an operation of the human detecting means and stopping an operation of the detection transmitting means when the locking state of the door is continued for a predetermined second period after the operation of the intermittent transmitting means is stopped by the first stopping means.

3. The unlocking system according to claim 2, wherein the detection transmitting means transmits the request signal to the outside of the vehicle with an output power level higher than the output power level of the intermittent transmitting means.

4. The unlocking system according to claim 2, wherein the receiving means is capable of varying a reception sensitivity of the request signal, and
wherein the portable device further includes:
a determination means for determining based on an initial signal of the request signal whether the request signal for which reception of the request signal by the receiving unit is started is a request signal from the detection transmitting means when the reception of the request signal is started by the receiving means; and
a sensitivity setting means for setting the reception sensitivity of the receiving means to a sensitivity rower than that at a reception time of the initial signal if it is determined that the reception-staffed request signal is a request from the detection transmitting means by the determination means.

* * * * *